June 6, 1961  H. L. McNALLY  2,986,773
APPARATUS FOR MAKING LIGHT WEIGHT AGGREGATE
Filed Nov. 5, 1958
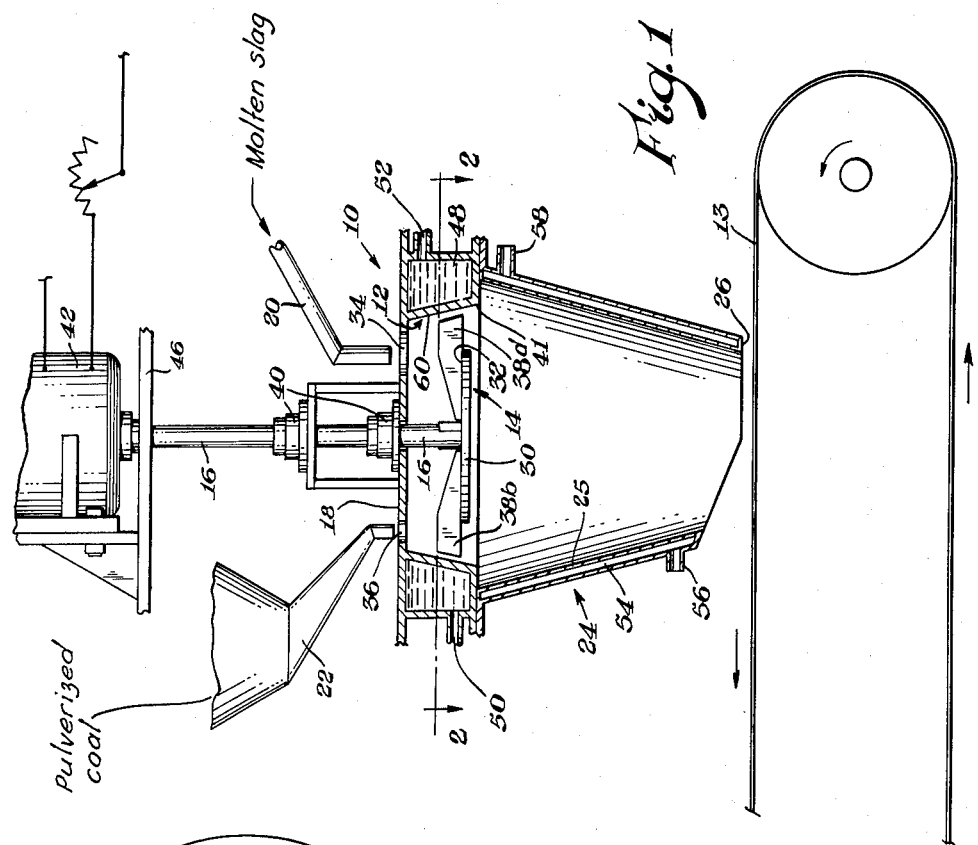
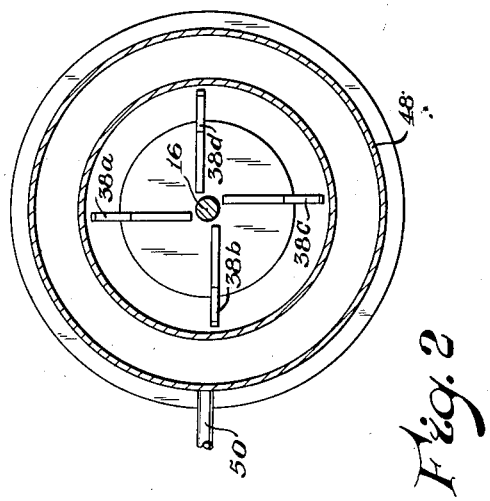
INVENTOR.
Howard L. McNally
BY Earl D. Ayers
AGENT

2,986,773
APPARATUS FOR MAKING LIGHT WEIGHT AGGREGATE

Howard L. McNally, Mount Pleasant, Mich., assignor to The Dow Chemical Company, Midland, Mich., a corporation of Delaware
Filed Nov. 5, 1958, Ser. No. 772,097
7 Claims. (Cl. 18—2.6)

This invention relates to an apparatus for converting molten slag to light weight aggregate which is suitable for use in the building materials industry.

The problem of disposing of molten slicate slag such as boiler furnace slag or of converting the slag to a useful marketable product has long been a serious one. Various types of conversion apparatus have previously been used to convert other types of slags such as blast furnace slag, to a light weight aggregate. The conversion is usually accomplished in conventional converters by subjecting molten slag to treatment by steam (or to water which is vaporized by the slag to form steam). When used in the conversion of blast furnace slag, the light weight aggregate formed thereby is often suitable for use as an aggregate material in the making of building blocks in which high structural strength is not required.

Apparatus used in processing blast furnace slag has not, however, proved very satisfactory when used in processing other silicate slags such as boiler furnace slag, which is an iron aluminum silicate type of slag.

For example, attempted conversion of boiler slag in apparatus of the water or steam contact type used in converting blast furnace slag has resulted in an expanded product which is more dense than is desired for use as a light weight aggregate material, has non-uniform or substandard strength characteristics, or the apparatus simply does not operate well as a continuously operating means for converting molten boiler slag.

Accordingly, a principal object of this invention is to provide an improved apparatus for converting molten silicate slag to a light weight aggregate material suitable for use in building materials.

Another object of this invention is to provide an improved apparatus for converting molten iron aluminum silicate type slag to light weight aggregate of generally uniform cellular structure and strength characteristics.

In accordance with this invention pulverized gas liberating material, usually a carbonaceous material, is mixed with molten slag as the slag is being violently agitated. The molten slag, impregnated with particles of gas liberating material, expands as the gas is liberated, expanding the slag into a light weight mass having a cellular structure as the slag is cooled in a controlled manner.

As a specific example of the operation of the invention, molten slag and pulverized carbonaceous material, such as bituminous coals, are fed into a walled chamber and impinge on a rotating beater contained therein. The rotating beater intimately mixes the slag and carbonaceous material, causing globules of the mixture to be thrown against the cooled wall of the chamber. The cooling and expanding globules move downwardly and break away from the wall and fall into a conveyor.

The invention, as well as additional objects and advantages thereof, will best be understood when the following detailed description is read in connection with the accompanying drawings, in which:

FIG. 1 is a side elevational view, partly in section, of slag conversion apparatus made in accordance with this invention, and FIG. 2 is a sectional view taken along the line 2—2 of FIG. 1.

Referring to the drawings, there is shown the slag conversion apparatus, indicated generally by the numeral 10, comprising an inverted cup-shaped conversion chamber 12 having side walls 60 which diverge outwardly in the downward direction and having a rotatable agitator, indicated generally by the numeral 14, attached to a shaft 16 extending axially through the closed upper end 18 of the chamber 12. The side walls diverge outwardly not less than 5 degrees and preferably not more than 10 degrees from the vertical axis of the chamber. Means such as a tube 20 connected to a boiler furnace (not shown) or other source of molten slag are provided for feeding molten slag into the conversion chamber 12. A hopper 22 is provided for feeding particulated carbonaceous material, such as pulverized coal, for example, into the chamber 12. A water cooled duct, indicated generally by the numeral 24, is disposed below the conversion chamber 12 and a conveyor 13 is disposed beneath the outlet end 26 of the duct 24 to receive the globules of expanded slag which fall through the conversion chamber 12 and through the duct 24. The conversion apparatus 10 is supported above the conveyor by means of a suitable supporting frame not shown. The side walls 25 of the duct 24 should be either parallel with the vertical axis of the chamber 12 or converge downwardly not more than 10 degrees and preferably not more than 5 degrees.

The agitator 14 comprises a plate 30, conveniently made circular in shape, for example, which has a flat upper surface 32 facing the input openings 34, 36 for slag and particulated carbonaceous materials, respectively. Four beater bars 38a, 38b, 38c, 38d are disposed on the upper surface of the plate 30. While the beaters 38a–38d may be disposed generally radially with respect to the shaft 16, the beaters 38a–38d may advantageously be displaced a short distance laterally from a true radial array to produce a fanning or air propelling action when the beaters are rotated.

The shaft 16 is connected to the center of the plate 30 and the array of beater blades 38a–38d are symmetrically disposed with respect to the shaft 16. The shaft 16 is supported by a pair of thrust bearings 40, which are mounted on the supporting frame 28.

An electric motor 42 having a variable speed control and suitably supported by a frame member 46 is coupled to the upper end of the shaft 16. Other motors or drive means having variable speed controlling means may be substituted for the motor 42 if desired. The duct 24 is also provided with a cooling jacket 54 to which coolant is applied through the inlet 56 and withdrawn through the outlet 58.

The conversion chamber 12 contains a water jacket 48 through which water or other suitable coolant is circulated. The coolant is supplied to the cooling jacket through a fluid entry inlet 50 and is withdrawn through the outlet 52 which is remotely disposed with respect to the inlet.

In operation molten slag is fed into the slag inlet 34 and falls onto the rotating plate 30 and beater bars 38a–38d. Particulated carbonaceous material, such as coal, which is pulverized to pass through a sixteen mesh screen, is simultaneously fed into the converter chamber 12 through the inlet 36 and falls upon the plate 30 and beater bars, 38a–38d. The pulverized coal may be fed into the conversion chamber 12 by any convenient metering means, such as, for example, by mixing the pulverized coal at the desired rate with compressed air and blowing the mixture into the conversion chamber 12. In the embodiment of the invention illustrated the fanning action occurring as a result of the rotating of the beater bars 38a–38d tends to somewhat retard the feeding in of particulated material into the conversion chamber 12. The forcing of air and pulverized coal into the chamber 12 is helpful in the burning of the carbonaceous material.

While pulverized bituminous coal has been specifically described as one carbonaceous material which may be used in practicing this invention, other carbonaceous materials may be used. Pulverized saw dust, carbon particles, or lamp black are typical carbonaceous materials which are adapted to be used with this invention.

Alternatively, good, strong, light weight aggregate has been made when a gas liberating material such as baking soda has been substituted for the pulverized coal. While baking soda may be said to be a carbonaceous material, other materials may be used which decompose at suitable rates at the operating temperature of the slag and form gas inclusions within the slag.

The amount and type of gas liberating additive (such as pulverized coal, for example) which must be worked into the molten slag as well as the rate of rotation of the agitator 14 and the cooling rate and rate of flow of the slag must be suitably determined for each type of slag which is to be converted to light weight aggregate.

The molten slag is fed into the converter through the tube or trough 20 (or by other means such as a water cooled funnel, not shown), falling as a stream onto the rotating bars 38a–38d of the beater 14. The particulated carbonaceous material, commonly pulverized coal, also falls onto the rotating agitator 14, the slag and pulverized coal being mixed together and thrown outwardly by centrifugal force. The mixture of slag, pulverized coal and air is thrown by centrifugal force onto the slightly downwardly diverging side walls 60 of the conversion chamber 12. The mixture of slag, pulverized coal and air is deposited as successive layers on the walls 60 of the conversion chamber. Some of the coal burns on contact with the slag, but a substantial part of the coal remains unburned until after the aggregate is deposited on the walls 60 of the conversion chamber. The pulverized coal dust while more or less entrapped in the molten, plastic slag, becomes heated, thereby liberating volatile matter forming gas inclusions which cause the slag, which is still in a plastic state, to expand. Some of the coal also burns to produce gases.

As more of the molten slag-air-pulverized coal mixture builds up on the walls 60, the mixture is usually forced downwardly by its own weight along the diverging sides 60, chunks breaking off as the edge 41 of the chamber 12 is reached and falling onto the conveyor 13. Should the above described mixture build up heavily on the walls 60 without falling therefrom, the ends of the rotating beater bars 38a–38d scrape the deposit of slag mixture and remove chunks of the plastic slag mixture therefrom, the chunks or globs dropping onto the conveyor 13.

Because the beater bars 38a–38d often tend to fling the globs or chunks of slag mixture or aggregate outwardly, the duct 24, whose sides converge, is used to prevent undue scattering of the aggregate and to direct the falling chucks of aggregate onto the conveyor 13.

In one pyrolytic slag conversion apparatus made in accordance with this invention the diameter of the agitator 14 is approximately 19 inches and the side walls 60 of the conversion chamber are spaced about one half inch from the ends of the beater bars 38a–38d. The half inch spacing has been found to be critical, because less spacing plugs the apparatus and more spacing results in an aggregate having gas inclusion bubbles of widely varying size, which is less desirable, from a quality standpoint, for use as an aggregate in building blocks than is aggregate material having relatively uniform, small gas inclusion bubbles. Four beater bars are used; the bars 38a–38d and the plate 30 being cast as an integral unit and made of a stainless steel alloy which is capable of operation at high temperatures (such as 309 stainless steel).

When a stream of molten slag of between one-quarter inch and two inches in diameter is fed by gravity into the conversion chamber through the inlet opening 34, a light weight aggregate is produced when pulverized coal (0×16 mesh size works well) is simultaneously fed into the conversion chamber 12, at a uniform rate of about 7½ to 30 pounds per ton of molten slag, and the beater bars 38a–38d are rotated to provide a velocity, at the outer end thereof, of from 3,500 feet to 4,500 feet per minute with best results occurring at a velocity of about 4,000 feet per minute.

When the above described pyrolytic conversion apparatus is used with a dense, molten ash or slag, resulting from, for example, the combustion of coal at about 3,000 degrees Fahrenheit, an excellent light weight aggregate results when 10 pounds of 0×16 mesh pulverized bituminous coal is fed into the conversion chamber with each ton of slag and when the beater bars 38a–38d are rotated to provide a velocity at the outer ends of the bars of about 4,000 feet per minute.

It has been found that when a dense iron aluminum silicate molten slag comes into contact with water or water vapor it does not produce a usable aggregate. Thus, although parts of the pyrolytic conversion apparatus of this invention are water cooled, no water other than the small percentage composition of water which is inherent in coal is permitted to come into contact with the molten slag while the slag is undergoing treatment in the apparatus.

The cooling of the conversion chamber 12 and the duct 24 is controlled by adjusting the amount of water which is circulated through the cooling jackets. In the conversion chamber 12, which contains a water jacket having about 20 gallons capacity, good results are obtained when if about 30 gallons of cool water per minute are circulated through the jacket. (It was found that when only 10 gallons per minute of water was circulated through the jacket that a considerable part of the water was converted to steam.)

The term "gas liberating material," as used herein, is intended to include non-aqueous, solid materials which, when mixed with molten slag, liberate gas by burning, reaction with the slag, or decomposition.

Also, while half-inch spacing between the beater bars 38 and wall 60 of the mixing chamber 12 is preferred, a slight deviation in spacing, such as one sixteenth inch closer to the wall or one eighth inch further from the wall, are operable.

What is claimed is:

1. Apparatus for converting molten iron-aluminum-silicate type slag to light weight aggregate, comprising an inverted frusto-conical cup shaped mixing chamber having an open lower end, a closed top and downwardly diverging side walls, said side walls diverging at at least five degrees from the longitudinal axis of the chamber, means for cooling said side walls, a rotatable agitator having an axis of rotation and a plurality of blade-like elements disposed in a symmetrical array about said axis of rotation, said agitator being disposed within and axially aligned with respect to said chamber, each of said blade-like elements having ends which are spaced from said side walls of the mixing chamber by approximately one half inch, means for directing molten slag onto said blade-like element, and means for metering particulated gas liberating material onto said agitator.

2. Apparatus in accordance with claim 1, wherein said agitator comprises a hub having a plurality of blade-like elements extending therefrom.

3. Apparatus in accordance with claim 1, wherein a water jacketed duct work skirt encircles said chamber and extends downwardly from the chamber, the angle made by the skirt with respect to the longitudinal axis of the chamber being between zero and ten degrees.

4. Apparatus in accordance with claim 1, wherein means are provided for rotating said agitator.

5. Apparatus in accordance with claim 1, wherein said means for cooling said side walls is a fluid cooling jacket adapted to be connected to a source of coolant fluid.

6. Apparatus in accordance with claim 4, wherein means are provided for controlling the rate of rotation of said agitator.

7. Apparatus in accordance with claim 1, wherein said means for directing molten slag and means for directing a metered amount of particulated gas liberating material each includes an aperture in the top of said mixing chamber, each of said apertures being disposed above said agitator.

References Cited in the file of this patent

UNITED STATES PATENTS

| | | |
|---|---|---|
| 1,051,844 | Passow | Jan. 28, 1913 |
| 2,305,172 | Landgraf | Dec. 15, 1942 |
| 2,880,456 | Kuzela et al. | Apr. 7, 1959 |